United States Patent [19]
Johnson et al.

[11] Patent Number: 4,783,830
[45] Date of Patent: Nov. 8, 1988

[54] PATTERN RECOGNIZING CONTENT ADDRESSABLE MEMORY SYSTEM

[75] Inventors: Patrick Johnson, College Park; David W. Rose, Bowie, both of Md.

[73] Assignee: American Electronics, Inc., Lanham, Md.

[21] Appl. No.: 29,670

[22] Filed: Mar. 24, 1987

[51] Int. Cl.⁴ .............................................. G06K 9/64
[52] U.S. Cl. ............................................ 382/34; 382/18
[58] Field of Search ................. 382/34, 35, 36, 18; 340/146.2

[56] References Cited

U.S. PATENT DOCUMENTS

| | | | |
|---|---|---|---|
| 3,103,646 | 9/1963 | Sheaffer et al. | 382/35 |
| 3,104,369 | 9/1963 | Rabinow et al. | 382/35 |
| 3,246,296 | 4/1966 | Heizer et al. | 382/35 |
| 3,284,772 | 11/1966 | Stewart | 382/35 |
| 3,290,651 | 12/1966 | Paufve et al. | 382/18 |
| 3,713,100 | 1/1973 | Hemstreet | 382/34 |
| 3,719,099 | 1/1973 | Hemstreet | 382/34 |
| 4,032,885 | 6/1977 | Roth | 340/146.2 |
| 4,119,946 | 10/1978 | Taylor | 382/34 |
| 4,498,189 | 2/1985 | Mori | 382/34 |

*Primary Examiner*—Leo H. Boudreau
*Assistant Examiner*—Donald J. Daley
*Attorney, Agent, or Firm*—Wegner & Bretschneider

[57] ABSTRACT

A pattern recognizing content addressable memory system and method therefor, according to the present invention, "translates" patterns into a point in N-dimensional space. In both the analog and digital embodiments of the invention, data representing "items" or "discrete pieces" of reference patterns are stored throughout a highly-interconnected network of processing units. Data representing items of a pattern to be analyzed are input into the system and compared to each of the stored patterns. The distance between the point in N-space representing an unknown pattern and the point representing a reference pattern is inversely proportional to the degree of similarity between the unknown pattern and the reference pattern.

15 Claims, 2 Drawing Sheets

PATTERN RECOGNIZING CONTENT ADDRESSABLE MEMORY SYSTEM

TECHNICAL FIELD OF THE INVENTION

The present invention generally relates to a content addressable memory system and, more particularly, to a content addressable memory system implemented and associative and parallel processing techniques. This system has applications in the field of artificial intelligence and other related computer fields, due to its ability to quickly evaluate an unknown, subject pattern against a stored reference pattern set, with a measurable level of confidence.

BACKGROUND OF THE INVENTION

Conventional Von Neumann type computers use location addressable memory and sequential processing to store and manipulate data. These computers process information using a series of programmed steps and identify data based on its stored location in the system. They often cannot solve problems requiring analysis of very "noisy" data to an acceptable level of confidence or cannot solve them quickly enough to be useful.

The failure to efficiently discern internal consistencies in confusing, incomplete and/or extraneous data is at the heart of many of the current limitations in computer technology, particularly as it relates to artificial intelligence and pattern recognition problems. In its broadest sense, pattern recognition involves the ability to differentiate or classify previously unencountered data based upon relative comparisons to known data. The data itself can take on any form, i.e., audio, visual, or the like, and the noise polluting the signal will be variations or distortions of the data. For example, variations in accent, pitch, or harmonic content, can make the computer analysis of human speech difficult.

Thus, there is a need for a system which can efficiently and reliably analyze and classify previously unseen and/or noisy data. To be useful as a pattern recognizer, the system should be able to generate outputs representing the degree of similarity between an unknown pattern and each of several reference patterns or sets of reference patterns. Moreover, the system should be "adaptable", so that incorrect generalizations may be corrected and a desired level of confidence attained.

SUMMARY OF THE INVENTION

The content addressable memory system in accordance with the present invention compares the pattern to be tested with previously stored "known" or reference patterns in order to classify the unknown pattern. The system can generalize from the reference data to classify patterns never before encountered and is thus considered "associative". The system can determine the degree of similarity between the unknown pattern and each stored pattern or group of patterns. It will identify those patterns which most closely match the unknown pattern so that a quantitative evaluation of the similarity can be made.

There is no inherent limit to the number of reference patterns the system can store. The more known patterns that are stored, the more accurate the system is in its identifications.

Conceptually, in both an analog and a digital embodiment of the present invention, each reference pattern is translated into a single point in N-dimensional space, with the number of dimensions determined by the number of elements which make up each pattern. For example, a video picture composed of 1000 dots or "pixels" would define a single point in 1000-dimensional space. The "degree of similarity" between the unknown pattern and each of the reference patterns is defined in this invention as the "linear distance" between the points representing the patterns. The smaller the linear distance between the N-dimensional point defined by a reference pattern and that defined by the unknown pattern, the greater the degree of similarity. A zero distance corresponds to an identical pattern match.

In a first preferred embodiment of the present invention, the system includes a highly interconnected network of very simple analog computational elements. A number of inputs corresponding to an unknown pattern (preferably in the form of analog voltages) are applied to the network. Each computational element is made up of an analog processing unit and a memory cell containing a stored analog value. Each stored analog value is an "item" or single piece of one of the example patterns. For example, a system which has stored 100 examples of video pictures, each of which consists of 1000 pixels, i.e., items, would require 100,000 memory cells and 100,000 processing units. Computational elements are groupd into "pattern modules", with each pattern module preferably containing one complete example pattern.

In operation, each computational element compares an input voltage corresponding to an item from an unknown pattern to the voltage stored in its memory cell and generates an output related to the difference between the voltages. Each computational element in the system performs this operation simultaneously, i.e., in parallel. Therefore, the time required for the system to classify an unknown pattern is determined by the processing delay of each computational element and not by the number of computational elements or the number of stored example patterns. The sum of the outputs from each computational element in a pattern module represents the degree of similarity between the pattern stored in that pattern module and the unknown pattern.

In a second preferred embodiment of the present invention, the system includes multiple digital microprocessors interconnected in such a way that the function of one or more computational elements is performed by a single microprocessor. In this preferred embodiment, each item of a pattern is converted from analog to digital values and presented serially to the processors for storage or comparison. Each processor compares the digitized unknown pattern with the stored example patterns so as to implement the function described above. The result produced by this second preferred embodiment is a digital version of the analog result obtained by the first preferred embodiment; the choice between the two embodiments being determined by speed requirements, cost, size and other system requirements.

The device inherently lends itself to a parallel implementation for extremely high speed operation. It can be used by itself, or as a subsystem or peripheral of a larger processing system. Possible uses include visual pattern recognition, natural speech recognition, or any other application where high speed classification of patterns is required.

DETAILED DESCRIPTION OF THE PREFERRED EMBODIMENTS

Figure 1:
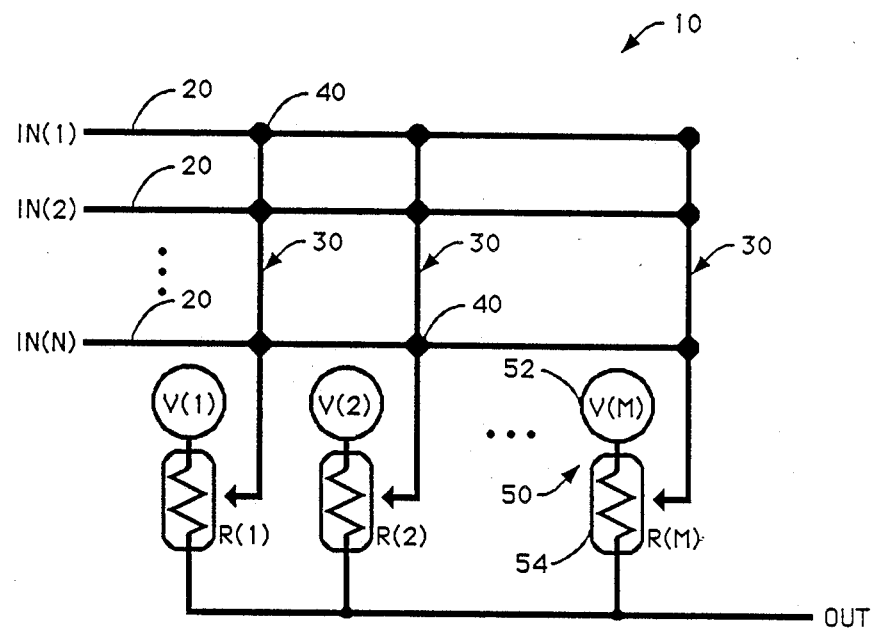
FIG. 1 is a schematic drawing of an embodiment illustrating the analog network architecture of a content addressable memory system in accordance with the present invention.
Figure 1A:
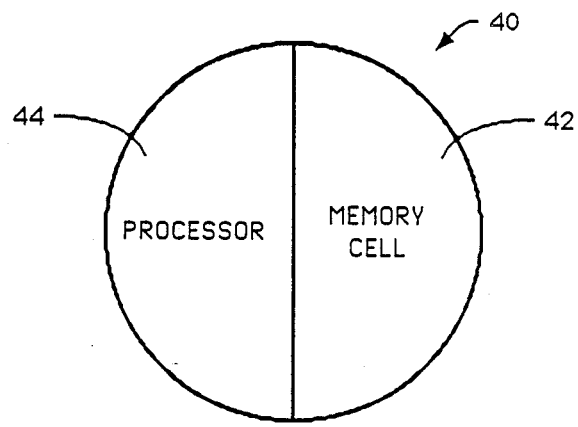
FIG. 1A is an exploded partial view of a portion of the network architecture as illustrated in FIG. 1.

FIG. 1 illustrates a first preferred embodiment of the analog network architecture of a content addressable memory device, in accordance with the present invention, generally designated by reference numeral 10. System 10 includes a plurality of N input lines or input busses 20 and a plurality of M modules 30 forming a highly interconnected network. The intersection of an input line and a module forms computational element or node 40. Node 40 includes a meory cell 42 and a processing unit 44. The memory cell stores a single value, at a given time, and the processing unit repetitively performs a single calculation, as will be further described below.

Each node will be conveniently identified herein by its location in the network as (pattern module, input line). Thus, node (3,5) represents the node at the intersection of the third pattern module and the fifth input line.

Each node stores an item of data representing a part of a known reference pattern. In this invention, an "item" is defined as a discrete piece of data which combines with other items to form a pattern. The nodes making up a pattern module contain the data from a single example pattern. Throughout the application, the term "pattern" is to be given its broadest possible meaning and includes any set of input data to be classified or identified or stored as an example. For instance, the pattern could be any set of pixels in a video image, any set of frequency contents over time of an audio signal, or the like.

Each item is represented by a "weight", preferably a voltage value, input on the input line and stored at the node. When a set of input voltage representing an unknown pattern is applied to the input lines, each node compares its respective stored voltage with the corresponding input voltage. If the stored voltage equals the input voltage at a particular node, that node contributes nothing to the output of its pattern module. However, if the input voltage is different than the stored voltage at a particular node, the node will contribute to the pattern module's output.

For example, if weight W of node (3,5), i.e. W(3,5) is 8 volts and the voltage on input line (5), i.e. IN(5), is 8 volts, then node (3,5) contributes nothing to the output of pattern module (3). If the input voltage on input line (5) does not equal 8 volts, then the node will contribute to the output of pattern module (3). The magnitude of the above-described contribution is defined as follows:

$$\text{NODE OUTPUT} = [IN(J) - W(I,J)]^2 \quad \text{Equation 1}$$

where J is an integer between 1 and N, inclusively, and I is an integer between 1 and M, inclusively.

Each pattern module 30 is further connected to an output element 50. Output element 50 preferably includes a voltage source 52 and a variable resistor 54, but it is envisioned that other components could be used.

The sum of the contributions from each node of a pattern module is used to set the value of the corresponding resistor. The value of resistor (I) corresponding to pattern module (I) is calculated as:

$$R(I) = \left[ \sum_{J=1}^{N} [IN(J) - W(I,J)]^2 \right]^{\frac{1}{2}} \quad \text{Equation 2}$$

It can be seen from Equation 2, that the value of a particular resistor will be zero, only if the voltages representing the unknown pattern applied to each of the input lines exactly matches the weights at each of the corresponding pattern module's nodes. In essence, each pattern module acts as a very specific pattern recognizer, responding to one, and only one input pattern.

If an unknown pattern is presented on the inputs, the values of the resistor in each output element are defined as an Equation 2, and the voltage on the output bus coupled to each of the output elements is given as:

$$\frac{OUT - V(1)}{R(1)} + \frac{OUT - V(2)}{R(2)} + \ldots + \frac{OUT - V(M)}{R(M)} = 0 \quad \text{Equation 3}$$

which, when rearranged, yields:

$$OUT = \frac{\sum_{I=1}^{M} \frac{V(I)}{R(I)}}{\sum_{I=1}^{M} \frac{1}{R(I)}} \quad \text{Equation 4}$$

Therefore, it can be seen that the pattern modules which have stored reference information segments "close to" the applied test information segments will dominate the bus.

System 10 requires that reference patterns be stored prior to the comparison operation. A number of reference patterns must be provided as representative examples of the class of information it must identify. For each reference pattern to be stored as a "known" example, one pattern module 30 is added to the input bus, with the weights stored at each node of the pattern module set to respond to the example. In addition to a number of "correct" reference patterns, a number of "incorrect" reference patterns are preferably stored. The "correct" and "incorrect" examples are differentiated within the system by the assignment of the voltage V(I) at voltage source 52. Thus, in one preferred embodiment, the network is "trained" by setting the voltage at voltage source 52 to 10 volts for all pattern modules containing a "correct" reference pattern, and 0 volts for all pattern modules containing an "incorrect" reference pattern.

In this way, if any one of the patterns in the set of "correct" examples are presented at the input bus as an unknown pattern, the pattern module with nodes trained with that specific reference pattern will set its resistor to zero, and the voltage source associated with that pattern module will drive the bus to 10 volts. Similarly, if a pattern corresponding to one of the examples of the "incorrect" set is presented as an unknown pattern, the bus will be driven to 0 volts.

If a pattern is presented on the input bus which is "close to", but not identical to, one of the "correct" examples, then the resistor associated with the pattern module containing that example will be set to nerely zero, the exact value being determined by Equation 2. This will cause the bus to be driven to nearly, but not exactly, 10 volts. Thus, not only does the device of the present invention correctly "identify" information or patterns for which it has been trained, it also can generalize its stored data to correctly identify data which it has never seen. In this way, the system may be considered "associative".

Figure 2:
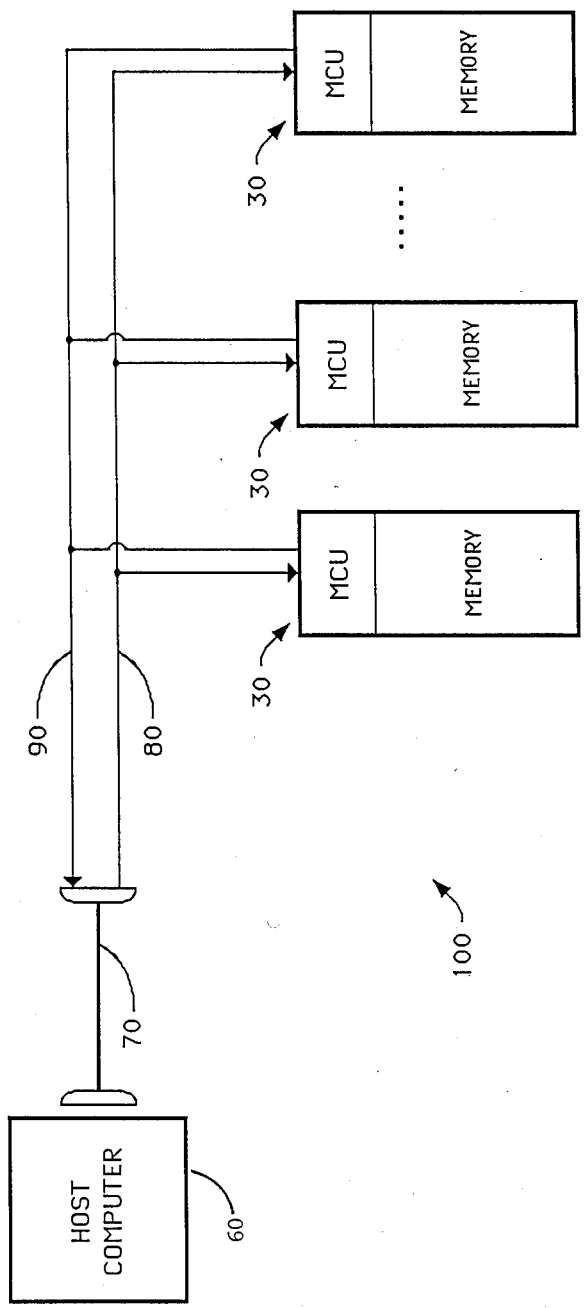
FIG. 2 is a schematic drawing of a further embodiment of the present invention, illustrating the digital configuration of the content addressable memory system of the present invention.

FIG. 2 illustrates the second preferred embodiment of the present invention, generally designated 100, in which the function of several nodes are performed by a single microprocessor and the input patterns are presented as serial data instead of parallel. In this embodiment, the output is calculated using a digital system rather than by using an analog resistor network as described in the first preferred embodiment. Thus, each item is represented by a digitized weight, rather than by a voltage as in the first preferred embodiment. In this case, modules 30 are preferably computer processing units capable of storing and manipulating data, as particularly illustrated in FIG. 2 and as further explained below.

The system of the present invention is preferably connected to host computer 60, as illustrated in FIG. 2. The host computer can be any general purpose digital computer, such as those typically used in scientific programming, data analysis or any other purpose for which computers are typically used. Thus, the content addressable memory system of the present invention may be a peripheral device which can be called upon by the host computer to analyze specific pattern recognition problems.

The host computer communicates with the pattern modules over communication link 70. Communication link 70 is formed, for example, by a RS-232C link or the like. The pattern modules are preferably interconnected by a serial data bus 80, analogous to input lines 20, which is, in turn, coupled to the communication link. Output line 90 transmits the data from the pattern modules back to the host computer.

The operation of system 100 is preferably controlled through the use of a variety of modes. In the preferred embodiment of the present invention, the communication through communication link 70 would include a combination of control characters and data which direct the system to operate in one of the following modes:

Mode 1: STORE PATTERN
Mode 2: RETRIEVE PATTERN
Mode 3: STORE IDENTIFIER
Mode 4: RETRIEVE IDENTIFIER
Mode 5: EVALUATE PATTERN
Mode 6: RETRIEVE RESULT To access any of these modes, the host computer will first transmit a control character addressing the parallel processing system for a pattern recognition problem. This first control character would be followed by a second control character indicating the mode of operation.

Mode 1 permits the host computer to load individual pattern modules with digitized weights representing reference patterns. After the second control character is sent, in this case indicating mode 1, a third control character is sent, indicating which of the M pattern modules will be loaded. For example, if the 25th pattern module is to be loaded, the third control character would be 25. The third control character would be followed with the weights representing the reference pattern to be stored.

Mode 2 permits the host computer to retrieve the data previously stored in any of the pattern modules. Mode 2 functions in the same manner as Mode 1, except that the pattern module addressed by the third control character sends its stored data to the host computer.

Mode 3 permits the host computer to store a number in each pattern module which identifies the pattern stored in that module. This would preferably be a two-byte identifier, transmitted after the third control character.

Mode 4 permits the host computer to retrieve the pattern identifier of Mode 3, identifying the pattern stored therein, from any pattern module.

Mode 5 permits an unknown test pattern to be compared to the stored reference patterns and generates a number representing how closely the unknown pattern matches each reference pattern, i.e., the degree of similarity. The host computer transmits the second control character indicating mode 5, followed by the digitized input values making up the unknown pattern to be analyzed. Each pattern module compares the input values with the corresponding reference weights in its pattern memory and increments a register based on the result. As previously discussed, this result is determined by subtracting the value of the input value from the weight and squaring the result. This number is then added to a summing register. When the values making up a single unknown pattern have been sent, the summing register in each of the M pattern modules will contain a number representing how closely the unknown pattern matches the stored pattern. The smaller the number in the summing register, the greater the degree of similarity between the unknown pattern and the known pattern stored in that pattern module.

Mode 6 permits the host computer to retrieve the number stored in the summing register of each pattern module following an operation in Mode 5. By finding the pattern module with the lowest number in the summing register, the host computer can determine which stored pattern most closely matches the unknown pattern and provide an output telling how close the closest match is.

The accuracy of the present invention, in both embodiments, relies upon the number of examples defined in the reference set. If the network is presented with an unknown pattern for which it generalizes a "wrong" answer, it is only necessary to add another pattern module defining that point to the network. This insures that the error does not recur.

A pattern recognizer in accordance with either preferred embodiment of the present invention would be useful for many applications which sequential, location addressable, computers do not perform well. For example, the present invention could be used for computer voice recognition, autonomous vehicle navigation, robotic parts handling, and thelike. The system of the present invention would be advantageous in any application requiring extremely high speed operation, generalization from known data, graceful degradation as components fail, etc.

The system of the present invention is both "fail-soft" and inherently expandable. Since the memory is distributed throughout the network, the failure of a few processing elements should have little or no observable effect on the accuracy of the output readings. Thus, the system exhibits a graceful degradation of performance as components fail. Further, if a given architecture proves insufficient to solve a particular problem, it is only necessary to add more processng elements until a sufficient level of complexity or "intelligence" is reached. The original network does not need to be retrained or altered in the least. Further, the speed of the system is not in any way dependent on the number of processing elements present.

The operation of a content addressable memory system in accordance with either embodiment of the present invention "translates" each input as a separate dimension in N-space. A network with N inputs, therefore, would define a space of N mutually orthogonal dimensions, and each pattern module with N weights would occupy a single point in that N-dimensional space.

In the analog version of the present invention, the voltage associated with each pattern module can be conceptualized as a field in the space surrounding the point occupied by the pattern module. As the input pattern changes, the point in N-space defined by that input moves, sometimes coming close to the points occupied by the pattern modules. As can be seen from Equation 2, the value of a particular resistor is set according to the distance from a point defined by the unknown input pattern in N-space to the point defined by the stored patterns of the particular resistor's pattern module. Thus, if the point defined by the unknown pattern comes close to the point occupied by the pattern module, then the field from the near pattern module will dominate the output. If the point defined by the input pattern occupies a point roughly equidistant from two or more pattern modules, then the output will be the result of their mutual influences, as given by Equations 2 and 4.

Theoretically, if the network were large enough, the field could be defined to such an extent as to be correct everywhere in the space. However, since a practical system must contain a finite number of nodes, the optimum points in N-space should be chosen (by choosing the best set of example patterns). More points must be defined in areas of N-space where classification of patterns are in close proximity to one another, while very few points are required in areas where there is little ambiguity.

Moreover, since all of the nodes can operate in parallel, each node can compare its stored value to a value from an unknown pattern at the same time. This results in extremely high-speed operation, particularly as compared with conventional computer systems.

The foregoing is for illustrative purposes only. Modifications may be made, by those skilled in the art, particularly with regard to matters of size, shape and arrangement of parts, yet remain within the scope of the invention as defined by the broad, general meaning in which the appended claims are expressed.

For example, the system could be modified to minimize the number of pattern modules required for a given application. For example, each node could store two values, instead of just one. The node contribution would then be zero if the test pattern fell between the two stored reference patterns and increase if the test pattern is outside the two stored patterns. In this way, a single pattern module would define the field in an entire rectangularly-shaped volume of N-dimensional space, rather than only a single point.

Alternatively, the weight assigned the contribution of each node to the register could be varied. This would require that Equations 1 and 2 be modified as follows:

$$\text{NODE OUTPUT} = A(J) * [IN(J) - W(I,J)]^2 \quad \text{Equation 1a}$$

$$R(I) = \left[ \sum_{J=1}^{N} A(J) * [IN(J) - W(I,J)]^2 \right]^{\frac{1}{2}} \quad \text{Equation 2a}$$

where A(J) is a real number between 0 and 1. This distorts the field surrounding each point in N-space defined by pattern module I, so that it decreases faster along some axis than along others. This increased flexibility will allow complicated fields in N-space to be defined using fewer pattern modules than would normally be required.

Additionally, the system of the present invention could be implemented as a hybrid analog/digital system. For example, the computation done at each "node" could be done digitally, but the values contributing to the output bus could be converted to analog values and treated as in the analog embodiment of the present invention.

We claim:

1. An analog content addressable memory system for determining the degree of similarity between an unknown pattern and a plurality of reference patterns, said system comprising:

input lines for presenting continuously variable values representing unknown patterns and reference patterns to said system, each of the patterns corresponding to a point in N-dimensional space;

memory means for storing said values representing the reference patterns; and processing means for determining the distance between said point representing the unknown pattern and each of said points representing the reference patterns, said distance being inversely proportional to the degree of similarity between the unknown pattern and said reference patterns, said distance D being determined by the formula $$\left[ \sum_{J=1}^{N} [IN(J) - W(I,J)]^2 \right]^{\frac{1}{2}},$$

where IN(J) are the values representing the unknown pattern, and W(I,J) are the values representing the stored patterns, J varying from 1 to N and I varying from 1 to M.

2. A content addressable memory system as in claim 1, wherein said input lines and said memory means form a highly-interconnected network, the intersection of each of said input lines and said memory means in the network forming a node, each of said nodes having a memory cell and a processing unit.

3. A content addressable memory system as in claim 2, wherein said values are voltages, and each time of a reference pattern is stored as one of said voltages at one of said nodes.

4. A content addressable memory system as in claim 3, wherein said nodes are grouped into pattern modules, each of said pattern modules containing one complete reference pattern.

5. A content addressable memory system as in claim 4, further comprising an output element coupled to each of said pattern modules.

6. A content addressable memory system as in claim 5, wherein each of said output elements include a variable resistor and a voltage source, and wherein the distance D is used to set said variable resistor.

7. A content addressable memory system as in claim 6 further comprising an output bus coupled to said resistors, the voltage on said output bus being determined by:

$$V(OUT) = \frac{\sum_{I=1}^{M} \frac{V(I)}{R(I)}}{\sum_{I=1}^{M} \frac{1}{R(I)}}$$

8. A method for analyzing patterns using an analog content addressable memory have a network of input lines and pattern modules intersectng at nodes, and a voltage output means coupled to each pattern modules, said method comprising:
  storing a voltage corresponding to a continuously variable item of reference pattern at each of said nodes, each of said pattern modules containing the voltages representing an entire reference pattern;
  applying an input voltage corresponding to an unknown pattern to be analyzed to said input lines;
  comparing each of said reference voltages to said input voltage at each of said nodes;
  outputting a value D at each of said nodes representative of the difference between the input voltage and the reference voltage stored at that node, D being equal to $$\left[ \sum_{J=1}^{N} [IN(J) - W(I,J)]^2 \right]^{\frac{1}{2}},$$

where IN(J) is the test voltage, and W(I,J) is the value of the reference voltage of said corresponding node, J varying from 1 to N and I varying from 1 to M;
  summing said output values D of each node along each of said pattern modules; and
  setting the value of each of said output means with said output valve sums, said output value sums being representative of the degree of similarity of the unknown pattern and the reference patterns along said corresponding pattern modules.

9. A method as in claim 8 further comprising comparing said output value sums, so as to determine which reference pattern most closely resembles the unknown pattern.

10. A method as in claim 8 wherein said storing of reference patterns includes providing both a set of correct examples defined by a positive voltage, and a set of incorrect examples defined by a zero voltage.

11. A method as in claim 8 wherein said storing of reference patterns includes providing both a set of correct examples defined by a positive voltage and a set of incorrect examples defined by a negative voltage.

12. A method for recognizing patterns using a digital content addressable memory having an input bus and an output bus serially connected to a plurality of microprocessors, said method comprising:
  storing continuously gradeable digitized values corresponding to an item of reference pattern in the memory of said microprocessors, said items being grouped into pattern modules so that each of said pattern modules includes an entire example pattern;
  applying digitized input values corresponding to items of unknown pattern to be analyzed to said input bus;
  comparing each of said reference values to said input values in each of said pattern modules;
  generating a result of the difference D between the input value and each of the reference values stored in that pattern module, D being equal to $$\left[ \sum_{J=1}^{N} [IN(J) - W(I,J)]^2 \right]^{\frac{1}{2}},$$

where IN(J) is said items of unknown pattern, and W(I,J) is said items of reference pattern, J varying from 1 to N and I varying from 1 to M;
  summing said results in each of said pattern modules; and
  outputting said sums, said sums being representative of the degree of similarity of the unknown pattern and the reference patterns along said corresponding pattern modules.

13. A method as in claim 12 further comprising storing an identifier at each of said pattern modules indicating the reference pattern stored therein.

14. A method as in claim 12 further comprising digitizing the unknown patterns to be analyzed and the reference patterns to be stored.

15. A digital content addressable memory system for determining the degree of similarity between an unknown pattern and a plurality of reference patterns, said system comprising:
  an input bus for receiving digitized values corresponding to items of unknown pattern to be analyzed;
  a plurality of microprocessors connected to said input bus, said microprocessors having memory means for storing continuously gradeable digitized values corresponding to an item of reference pattern, said items being grouped into pattern modules so that each of said pattern modules includes an entire example pattern, said microprocessors further having comparator means for comparing each of said reference values to said input values in each of said pattern modules, so as to generate a difference D that is inversely proportional to the degree of similarity between the known pattern and said reference patterns, D being equal to $$\left[ \sum_{J=1}^{N} [IN(J) - W(I,J)]^2 \right]^{\frac{1}{2}},$$

where IN(J) are the values representing the unknown pattern, and W(I,J) are the values representing the stored patterns, J varying from 1 to N and I varying from 1 to M.

* * * * *